(12) United States Patent
Yielding et al.

(10) Patent No.: US 6,726,409 B1
(45) Date of Patent: Apr. 27, 2004

(54) COOLING SYSTEM FOR PNEUMATIC UNLOADING OF CONTAINER

(76) Inventors: Bryan Yielding, 213 County Rd. 1151, Riceville, TN (US) 37370; John E. Olsta, 810 IH 45 North, Huntsville, TX (US) 77320

( * ) Notice: Subject to any disclaimer, the term of this patent is extended or adjusted under 35 U.S.C. 154(b) by 0 days.

(21) Appl. No.: 10/033,448

(22) Filed: Dec. 27, 2001

(51) Int. Cl.[7] .............................................. B65G 53/12
(52) U.S. Cl. ...................................... 406/146; 144/109
(58) Field of Search ........................... 414/151; 406/41, 406/105, 144, 146

(56) References Cited

U.S. PATENT DOCUMENTS

| | | | |
|---|---|---|---|
| 2,734,782 A | * | 2/1956 | Galle ......................... 406/132 |
| 4,205,931 A | * | 6/1980 | Singer et al. ................ 406/109 |
| 4,278,367 A | * | 7/1981 | Jacobson .................... 406/109 |
| 4,599,016 A | * | 7/1986 | Medemblik ................... 406/67 |
| 4,823,989 A | | 4/1989 | Nilsson |
| 4,993,883 A | | 2/1991 | Jones |
| 5,067,856 A | | 11/1991 | Sisk |
| 5,071,290 A | | 12/1991 | Johnson |
| 5,199,826 A | | 4/1993 | Lawrence |
| 5,580,193 A | | 12/1996 | Battle et al. |
| 5,618,136 A | | 4/1997 | Smoot |
| 5,647,514 A | | 7/1997 | Toth et al. |
| 5,718,017 A | | 2/1998 | Pavlick |
| 5,749,683 A | | 5/1998 | Kunse |
| 5,779,398 A | | 7/1998 | Battle et al. |

* cited by examiner

*Primary Examiner*—Joseph A. Dillon
(74) *Attorney, Agent, or Firm*—Chambliss, Bahner & Stophel, P.C.

(57) ABSTRACT

An apparatus for unloading particulate material from a container having a thermally-conductive shell includes an outlet for particulate material from the container, a material conveying conduit that is connected to the particulate material outlet, and an inlet and an outlet for pressurized gas. A conduit is also provided between the pressurized gas outlet and the material conveying conduit, along with a blower, compressor or other means for pressurizing gas and a conduit between the blower and the pressurized gas inlet. The outlet for pressurized gas is arranged with respect to the inlet for pressurized gas so that the pressurized gas is directed to flow from the inlet across at least a portion of the thermally-conductive shell to the outlet. The conduit between the pressurized gas outlet and the material conveying conduit is arranged so that pressurized gas entering the material conveying conduit may entrain material that is discharged from the particulate material outlet.

18 Claims, 12 Drawing Sheets

COOLING SYSTEM FOR PNEUMATIC UNLOADING OF CONTAINER

FIELD OF THE INVENTION

This invention relates generally to unloading systems for containers that are used to store or transport particulate materials. More particularly, the invention relates to a method and apparatus for cooling the entraining gas used in a pneumatic transport system for unloading particulate materials from such a container.

BACKGROUND AND DESCRIPTION OF THE PRIOR ART

Many particulate materials are conveniently transported by truck, although they may also be transported by railcar, barge or by other means. Trucks that are used to transport such materials may include a tractor and an attached trailer having a tank or other container mounted thereon. Similar containers may be used to store particulate materials. Frequently, these containers are referred to as pneumatic containers because of the pneumatic method, involving gas- or air-entrainment, by which they may be loaded and unloaded. Materials that are generally stored or transported in pneumatic containers include agricultural products such as grain, corn kernels, beans, flour, sugar, peanuts and the like, and intermediate products for various industrial uses such as plastic pellets, coke, lime, silica gel, powdered acid resins, rare earth powders and powdered alumina, and many others.

Pneumatic containers generally include one or more product compartments that are usually cylindrical or spherical in shape in order to facilitate unloading by a method which involves pressurizing the compartments. Cylindrical or spherical product compartments are also generally easy to completely empty. Each product compartment is provided with a discharge hopper that may be generally cylindrical or conical in shape. The product compartments are generally enclosed by a sheet metal sheath, especially when the container is mounted on a trailer or other transport device, which sheath provides an aerodynamically efficient outer container surface.

One type of known construction of such pneumatic containers comprises one or more generally cylindrical and horizontally disposed product compartments which are arranged along a common horizontal axis in at least partial fluid communication with each other. A cylindrical or conical discharge hopper is provided for each product compartment, and the axis of each such discharge hopper intersects the product compartment with which it is associated generally at right angles to the axis of the cylinder of the product compartment. Each discharge hopper has a material outlet at the bottom and a valve which controls the entry of material into the outlet. An unloading system is also provided which includes a blower or other mechanism for pressurizing air or another gas. The blower provides the energy required for unloading the material from the container in the form of compressed air or another gas. One end of a pressurized gas conduit is attached to the blower and the other end to a pressurized gas inlet in the container. Operation of the blower will compress air or gas and move it through the pressurized gas inlet into the container, thereby increasing the pressure of the air or gas above the material in the product compartment or compartments in the container in order to assist in discharging material through the hopper outlets. One end of a material conveying conduit is also attached to the blower and extends past and connects to each material outlet so that when the product compartment has been pressurized, air or another gas may be directed into the material conveying conduit to entrain material passing through each material outlet and carry it to the discharge end of the conduit. The container may be mounted on a frame which is supported by the chassis of a trailer.

Although the conventional pneumatic container operates satisfactorily to discharge many types of particulate materials, problems of product degradation may arise if the materials are temperature sensitive. Because an increase in pressure of a gas is directly proportional to an increase in its temperature (so long as its volume remains constant), pressurizing the air in the container will increase its temperature, and this increased temperature will be transmitted to the particulate material. Generally, the air that is compressed and blown into the container to assist in the unloading of particulate material will be heated by about 200° F. by the compression process. If the material is temperature sensitive, such as plastic pellets, for example, pressurizing the air in the container may even raise the temperature of the material past its melting point.

Plastics are generally transported in pellet or powdered form. When the pellets are subjected to high temperatures in the pneumatic unloading process, the plastic softens and tends to coat the walls of the discharge piping with long hair-like strands of plastic. These "stringers" may then break off at a later time and pass through the discharge conduit in a subsequent unloading operation. The presence of such non-uniformly sized "stringers" in the plastic material can create problems for the equipment that handles and processes the plastic and can contaminate a subsequent load of particulate material.

Various methods have been developed to deal with the problem of transport of temperature sensitive particulate materials. Thus, for example, it is known to employ a water-filled sheath around the conduit carrying the pressurizing air stream to the container. However, such a device requires that a supply of water be readily available at the unloading site, as well as the means for its disposal. It is also known to place cooling fins on the material conveying conduit. However, such cooling fins are bulky, heavy and expensive, and only marginally effective. It is also known to reduce the temperature created in a pressurizing system by restricting the operation of the blower or compressor to reduce the pressure produced. However, such restriction will slow the unloading process since the pressure differential between the container and the ambient conditions at the discharge end of the material conveying conduit will not be as great. Because of such reduced pressure in the container, the particulate material therein is also more likely to get clogged in the hopper outlets.

U.S. Pat. No. 5,580,193 and U.S. Pat. No. 5,779,398, both of Battle et al., and U.S. Pat. No. 5,618,136 of Smoot describe methods for reducing the temperature of the pressurizing air by placing a heat exchanger in the air stream. These methods require the employment of additional equipment, which increases the capital cost, operating expense and maintenance requirements for the system. The addition of heat exchanger components to a trailer-mounted container also increases the weight of the trailer, thereby reducing the payload it may carry as well as the fuel efficiency of the tractor-trailer combination. It would be desirable if a simpler method and apparatus could be provided that could be used to transfer particulate material from a container while minimizing any increase in the temperature to which the particulate material is exposed. It would also be desirable if such a method and apparatus could be provided that could be implemented by making only minor modifications of the conventional pneumatic container.

ADVANTAGES OF THE INVENTION

Among the advantages of the invention is that it provides a method and apparatus for the unloading of particulate material from a container while minimizing any increase in the temperature to which the material is exposed. Another advantage of the invention is that it provides such a method and apparatus which requires no significant addition of expensive equipment. Still another advantage of he invention is that it provides such a method and apparatus that does not add significant weight to a trailer-mounted container. Yet another advantage of the invention is that it provides such a method and apparatus utilizing only minor modifications to conventional pneumatic unloading systems.

Additional objects and advantages of this invention will become apparent from an examination of the drawings and the ensuing description.

EXPLANATION OF TECHNICAL TERMS

As used herein, the term particulate material refers to granular, fluent or comminuted material that is capable of being transported through a conduit by an entraining gas.

As used herein, the term container refers to an enclosure for particulate materials that may include one or more product compartments.

As used herein the term pressurized gas refers to the air or gas that is introduced into the pressurized gas inlet of the container, directed to flow across at least a portion of the thermally-conductive shell of the container, withdrawn from the pressurized gas outlet and conducted to the material conveying conduit where it entrains material that has been discharged through the material outlet, regardless of the particular pressure conditions of such gas as it passes through such circuit.

SUMMARY OF THE INVENTION

The invention comprises a method and apparatus for unloading particulate material from a container having a thermally-conductive shell, an outlet for particulate material and a material conveying conduit connected to the material outlet. The apparatus includes a pressurized gas inlet and a pressurized gas outlet in the container, as well as a conduit between the pressurized gas outlet and the material conveying conduit. A source of pressurized gas or other means for introducing pressurized gas into the container is provided, so that pressurized gas may be introduced into the container through the pressurized gas inlet and directed to flow across at least a portion of the thermally-conductive shell. The pressurized gas is withdrawn from the pressurized gas outlet and conducted to the material conveying conduit. Particulate material is discharged through the material outlet into the material conveying conduit, where it is entrained by the pressurized gas and conveyed through the material conveying conduit. The container may be mounted on a frame of a trailer for transport.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
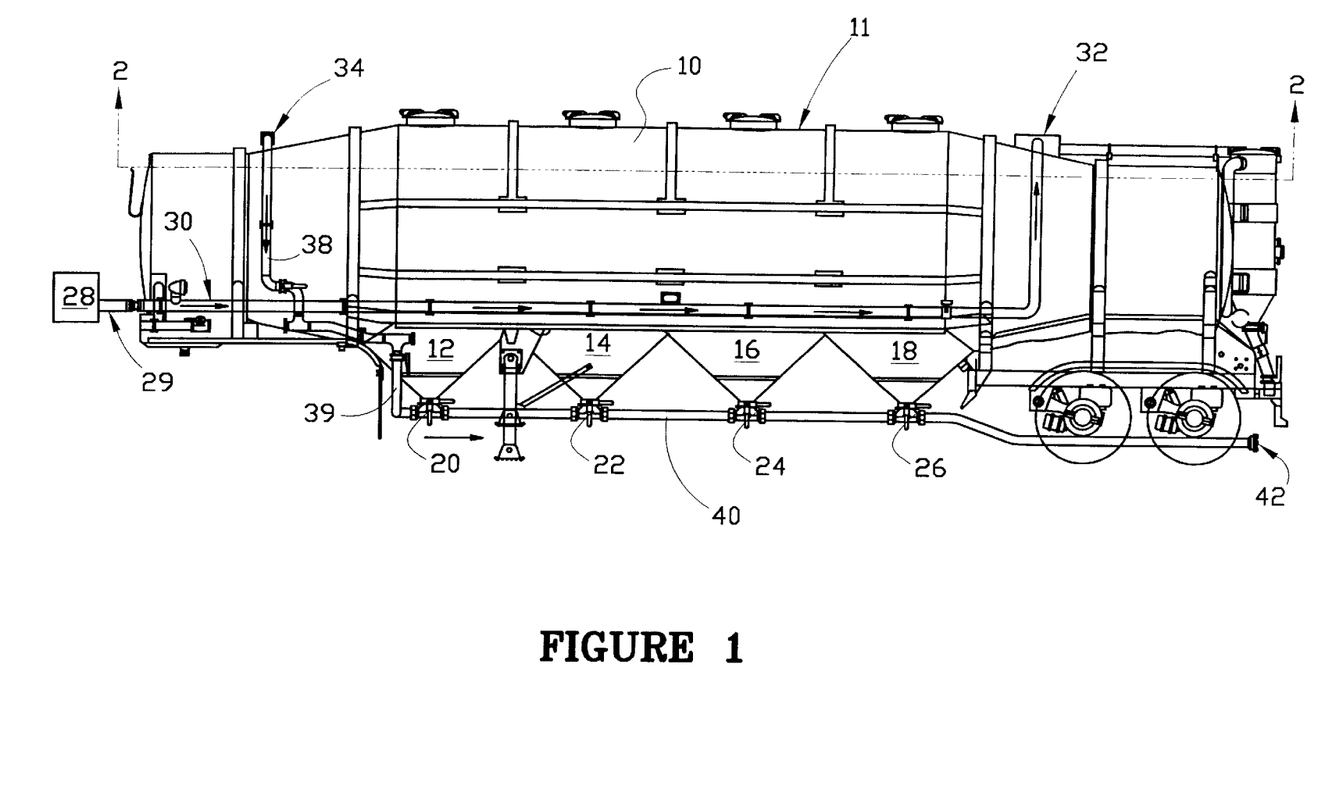
FIG. 1 is a side view of a first embodiment of the invention.
Figure 2:
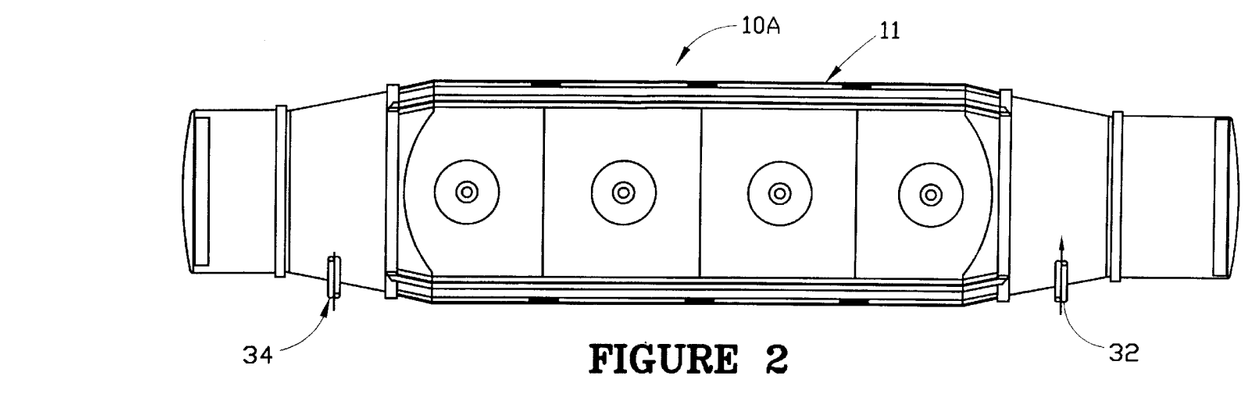
FIG. 2 is a sectional view of the embodiment of FIG. 1, taken through the line 2—2.
Figure 2A:
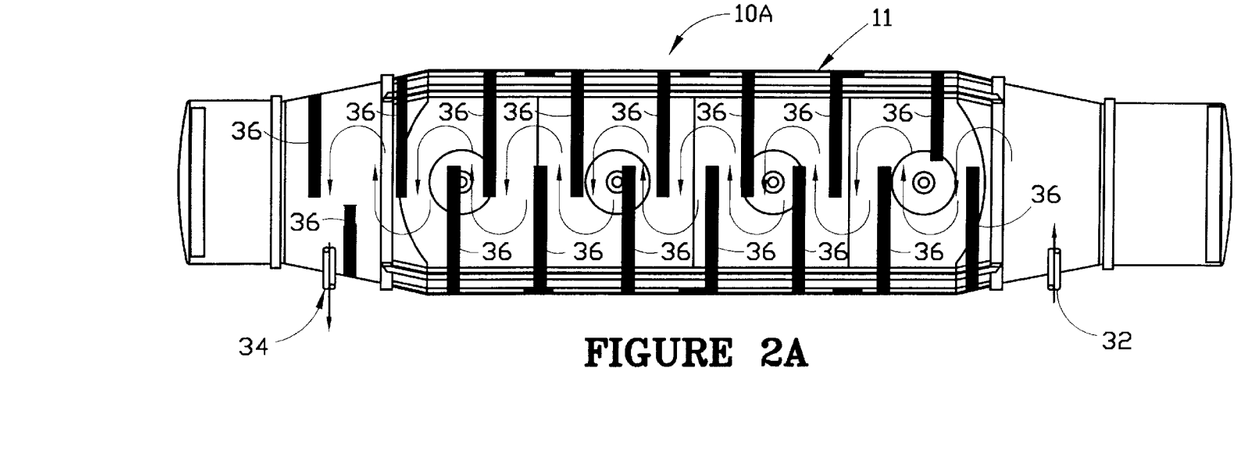
FIG. 2A is an sectional view, similar to that of FIG. 2, of a second embodiment of the apparatus of FIG. 1.
Figure 3:
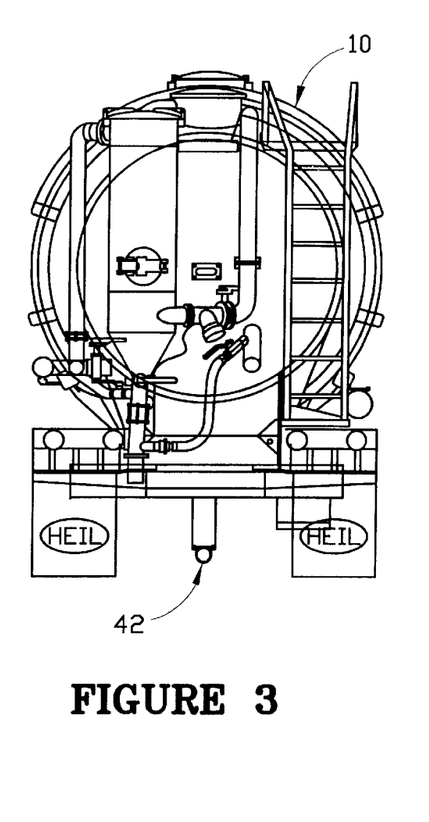
FIG. 3 is a rear view of the embodiment of FIGS. 1 and 2.
Figure 4:
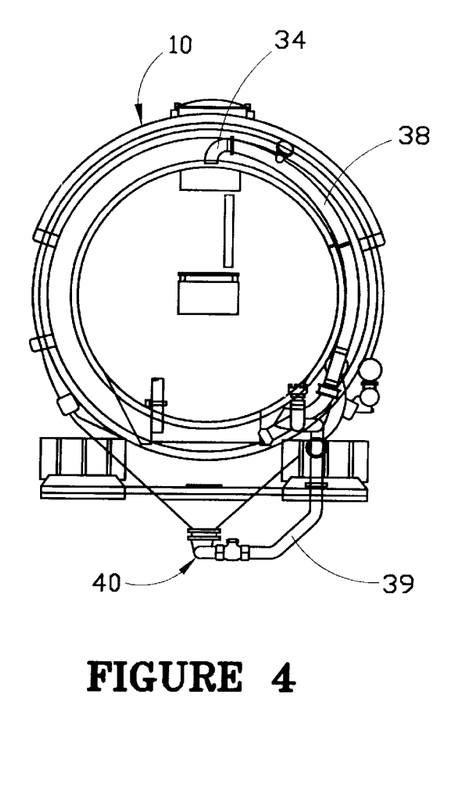
FIG. 4 is a front view of the embodiment of FIGS. 1, and 3.

Referring now to the drawings, the method and apparatus of the invention are illustrated by the presently preferred embodiments of a trailer-mounted container. FIGS. 1, 2, 3 and 4 illustrate a first embodiment of trailer-mounted container 10. Container 10 is provided with thermally-conductive shell 11, preferably of aluminum. Container 10 includes four generally cylindrical and horizontally disposed product compartments, the details of which are not shown in the drawings but which are well-known to those having ordinary skill in the art to which the invention relates. These product compartments are arranged along a common horizontal axis and are in at least partial fluid communication with each other. Conical discharge hoppers 12, 14, 16 and 18 are provided, one for each product compartment. Each discharge hopper has a material outlet at the bottom and a valve, such as valves 20, 22, 24 and 26, which controls the discharge of material from the outlet of the hopper. An unloading system is also provided which includes a blower or compressor for pressurizing air or another gas or another means or source for supplying a flow of gas. A blower or compressor is typically mounted on a tractor that is used to haul the trailer, and a schematic illustration of blower 28 is illustrated in FIG. 1. Conduit 29 attaches one end of pressurized gas conduit 30 to the blower, and the other end of conduit 30 is attached to pressurized gas inlet 32 (see FIGS. 1, 2 and 2A) in the container. Pressurized gas outlet 34 is also provided in the container for removal of pressurized gas therefrom. Preferably, the pressurized gas inlet and the pressurized gas outlet will be located generally above the level of particulate material in the container. Operation of the blower will move air or gas through pressurized gas inlet 32 into the container, in the direction shown by the arrows in line 30, thereby increasing the pressure of the air or gas in the container in order to assist in discharging material from the outlets into the material conveying conduit. In the embodiment of the invention illustrated in FIGS. 1, 2, 3 and 4, air or another gas enters the container through pressurized gas inlet 32 and flows across at least a portion of thermally-conductive shell 11 of container 10 to pressurized gas outlet 34. FIG. 2A illustrates a second embodiment of the invention, in which a series of internal baffles 36 has been added. The embodiment of FIG. 2A is otherwise identical to the embodiment of FIGS. 1, 2, 3 and 4. In the embodiment of FIG. 2A, baffles 36 direct the flow of air or other gas (as shown by the arrows in FIG. 2A) to flow from pressurized gas inlet 32 across at least a portion of thermally-conductive shell 11 of container 10A. In both the embodiments of FIGS. 2 and 2A, the pressurized gas is withdrawn from the container through outlet 34 and conveyed through conduits 38 and 39 to material conveying conduit 40 at a location upstream from the hopper outlets. Experimental results have shown that the temperature of the air exiting the container through outlet 34 can be reduced to near ambient temperature by heat transfer from the pressurized air to the thermally conductive shell of the container. It is believed that three modes of heat transfer are involved. It is believed that some heat is lost by conduction from the blower gas through the shell of the container, and additional heat is lost by convection and radiation from the outer surface of the shell to the atmosphere. It is also believed that further cooling is obtained by expansion of the gas from a small diameter conduit 30 (typically three or four inches in diameter) to the interior void space above the particulate material in the container.

As shown in FIG. 1, material conveying conduit 40 extends past and. connects to each of the hopper material outlets. When the system is operating and cooled pressurized gas is flowing from outlet 34 and into material conveying conduit 40, valves 20, 22, 24 and 26 may be opened to discharge particulate material into 40, where such material may be entrained and transported to discharge end 42 of the conduit.

Figure 5:
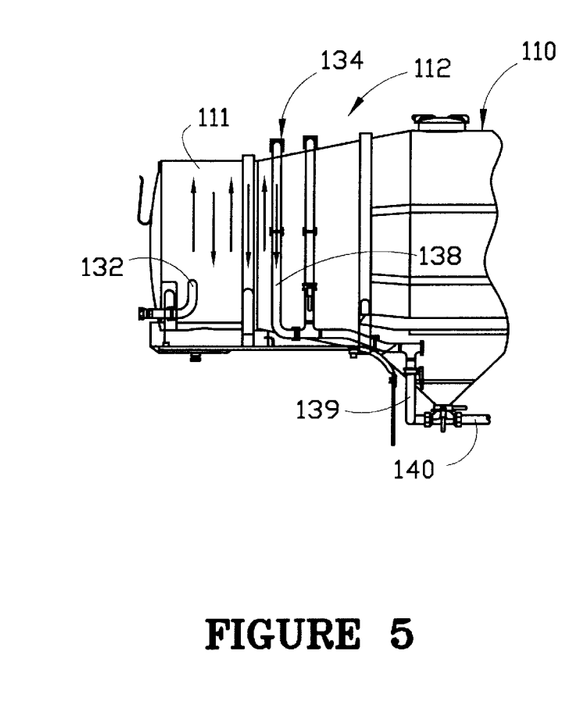
FIG. 5 is a partial side view of a third embodiment of the invention.
Figure 6:
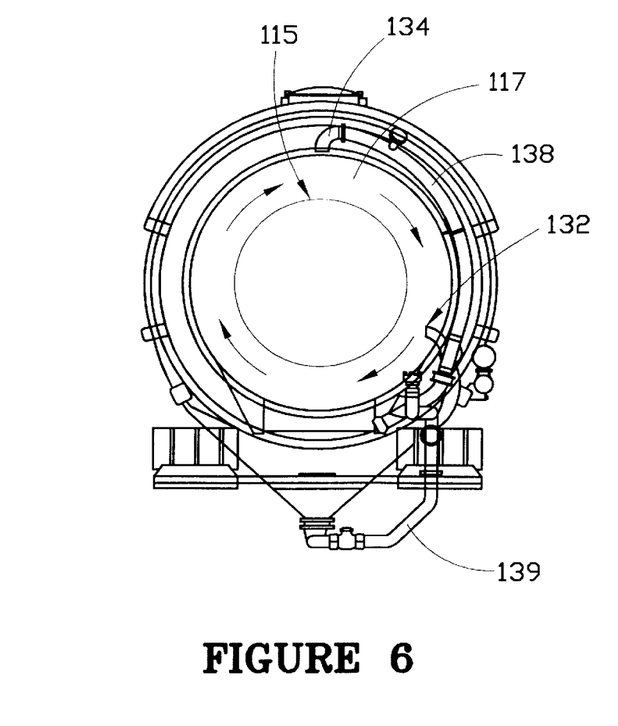
FIG. 6 is a front view of the embodiment of FIG. 5.

A third embodiment of the invention is illustrated in FIGS. 5 and 6. As shown therein, container 110 includes front section 112 that has thermally-conductive shell 111 and an inner wall 115 that creates an annular space 117.for heat transfer with the shell. In this embodiment of the invention, pressurized gas inlet 132 is provided at the front of front section 112. A conduit (not shown) may be used to attach inlet 132 to the blower. Pressurized gas outlet 134 is also provided in the front section of the container for removal of pressurized gas therefrom. Operation of the blower will move air or gas through pressurized gas inlet 132 into annular space 117 of the container, in the direction shown by the arrows in FIGS. 5 and 6. Since the front section is in fluid communication with the material storage portion of the container, the pressurized gas will increase the pressure of the air or gas in the container in order to assist in discharging material from the outlets into the material conveying conduit. In the embodiment of the invention illustrated in FIGS. 5 and 6, inner wall 115 serves to direct the flow of air or other gas (as shown by the arrows in FIG. 6) from pressurized gas inlet 132 across at least a portion of thermally-conductive shell 111 of the front section of container 110. The pressurized gas is withdrawn from the container through outlet 134 and conveyed through conduits 138 and 139 to material conveying conduit 140. When the system is operating and cooled pressurized gas is flowing from outlet 134 and into material conveying conduit 140, valves (not shown) may be opened to discharge particulate material into conduit 140, where such material may be entrained and transported to the discharge end (not shown) of the conduit.

Figure 7:
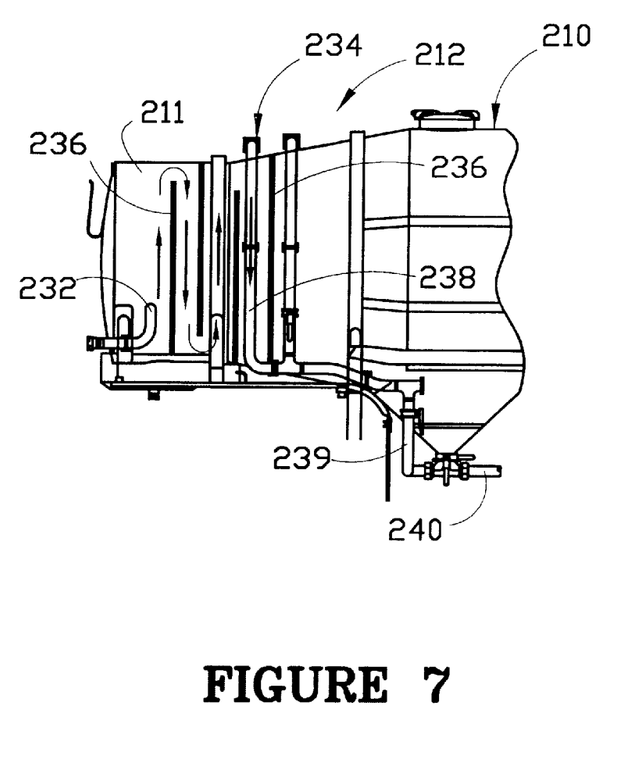
FIG. 7 is a partial side view, with a portion cut away, of a fourth embodiment of the invention.

A fourth embodiment of the invention is illustrated in FIG. 7. As shown therein, container 210 includes front section 212 that has thermally-conductive shell 211 and a series of baffles 236 that direct the flow of pressurized gas for heat transfer to and through the shell. In this embodiment of the invention, pressurized gas inlet 232 is provided at the front of front section 212. A conduit (not shown) may be used to attach inlet 232 to the blower. Pressurized gas outlet 234 is also provided in the front section of the container for removal of pressurized gas therefrom. Operation of the blower will move air or gas through pressurized gas inlet 232 into the front section of the container, in the direction shown by the arrows in FIG. 7. Since the front section is in fluid communication with the material storage portion of the container, the pressurized gas will increase the pressure of the air or gas in the container in order to assist in discharging material from the outlets into the material conveying conduit. In the embodiment of the invention illustrated in FIG. 7, baffles 236 serve to direct the flow of air or other gas from pressurized gas inlet 232 across at least a portion of thermally-conductive shell 211 of the front section of container 210. The pressurized gas is withdrawn from the container through outlet 234 and conveyed through conduits 238 and 239 to material conveying conduit 240. When the system is operating and cooled pressurized gas is flowing from outlet 234 and into material conveying conduit 240, valves (not shown) may be opened to discharge particulate material into conduit 240, where such material may be entrained and transported to the discharge end (not shown) of the conduit.

Figure 8:
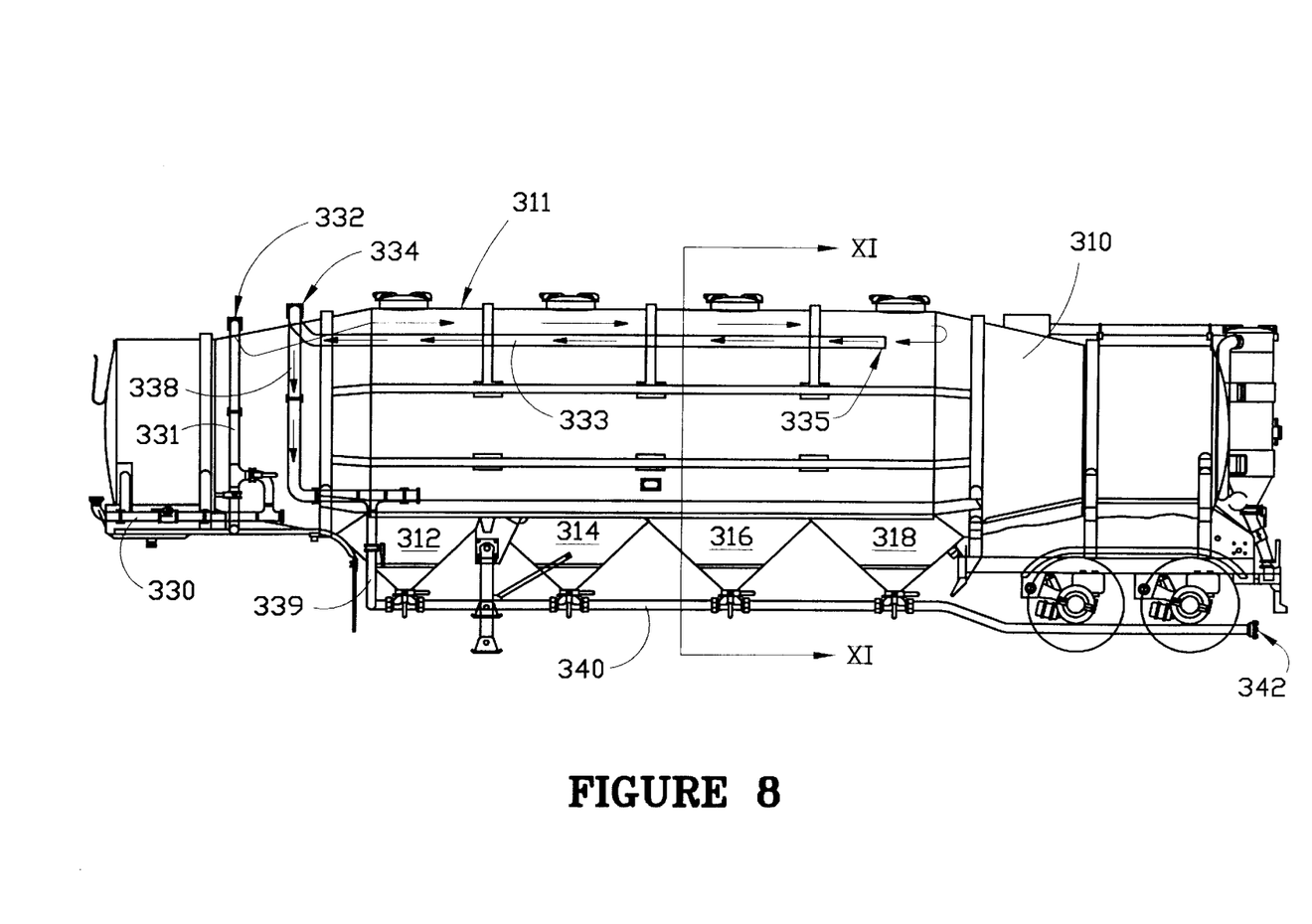
FIG. 8 is a side view of a fifth embodiment of the invention.
Figure 9:
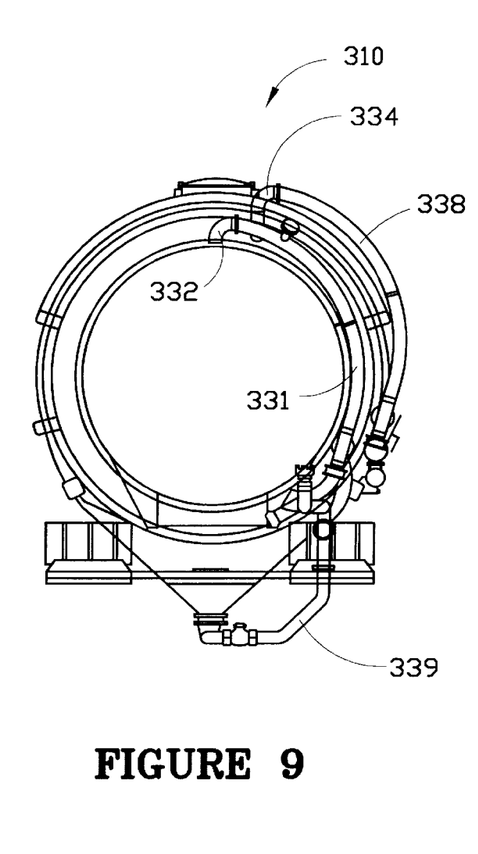
FIG. 9 is a front view of the embodiment of FIG. 8.
Figure 10:
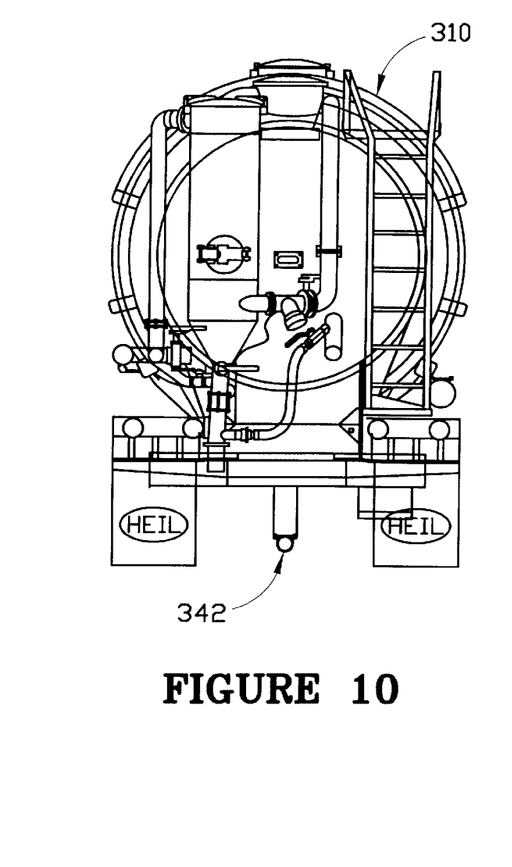
FIG. 10 is a rear view of the embodiment of FIGS. 8 and 9.

FIGS. 8–11 illustrate a fifth embodiment of the invention. As shown in FIGS. 8–10, container 310 is provided with thermally-conductive shell 311 and includes four generally cylindrical and horizontally disposed product compartments. Conical discharge hoppers 312, 314, 316 and 318 are provided, one for each product compartment. Each discharge hopper has a material outlet at the bottom and a valve which controls the discharge of material from the outlet of the hopper. An unloading system is also provided which includes a blower or compressor (not shown) for pressurizing air or another gas or another means or source for supplying a flow of gas. A conduit from the blower (not shown) is attached to one end of pressurized gas conduit 330, and the other end of conduit 330 is attached to pressurized gas conduit 331, which is attached to inlet 332 in the container. Pressurized gas outlet 334 is also provided in the container for removal of pressurized gas therefrom. Preferably, the pressurized gas inlet and the pressurized gas outlet will be located generally above the level of particulate material in the container. Operation of the blower will move air or gas through pressurized gas inlet 332 into the container, thereby increasing the pressure of the air or gas in the container in order to assist in discharging material from the outlets into the material conveying conduit. In the embodiment of the invention illustrated in FIGS. 8–11, various alternative ducting arrangements (illustrated in FIGS. 11A, 11B, 11C and 11IC) direct the flow of air or other gas (as shown by the arrows in FIG. 8) to flow from pressurized gas inlet 332 across at least a portion of thermally-conductive shell 311 of container 310. The pressurized gas enters internal duct 333 at rear end 335 and is conveyed through the internal duct to outlet 334. The cooled gas is withdrawn from the container through outlet 334 and conveyed through conduits 338 and 339 to material conveying conduit 340 at a location upstream from the hopper outlets. As shown in FIG. 8, material conveying conduit 340 extends past and connects to each of the hopper material outlets. When the system is operating and cooled pressurized gas is flowing from outlet 334 and into material conveying conduit 340, the hopper outlet valves may be opened to discharge particulate material into conduit 340, where such material may be entrained and transported to discharge end 342 of the conduit.

Figure 11A:
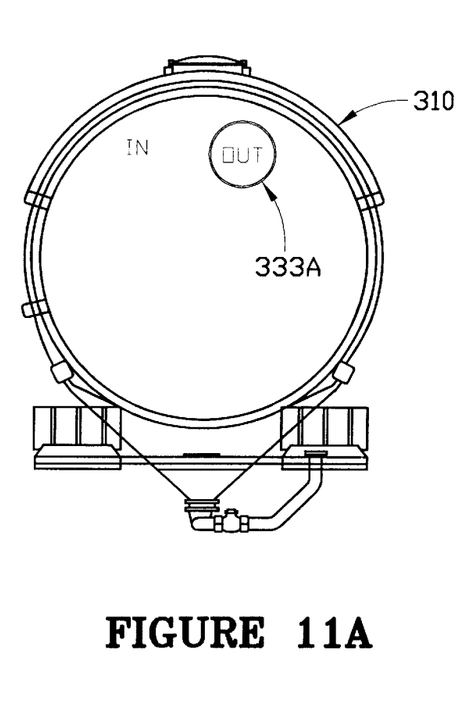
FIG. 11A illustrates a first embodiment of the ducting for pressurized gas flow of the embodiment of the invention illustrated in FIGS. 8–10.
Figure 11B:
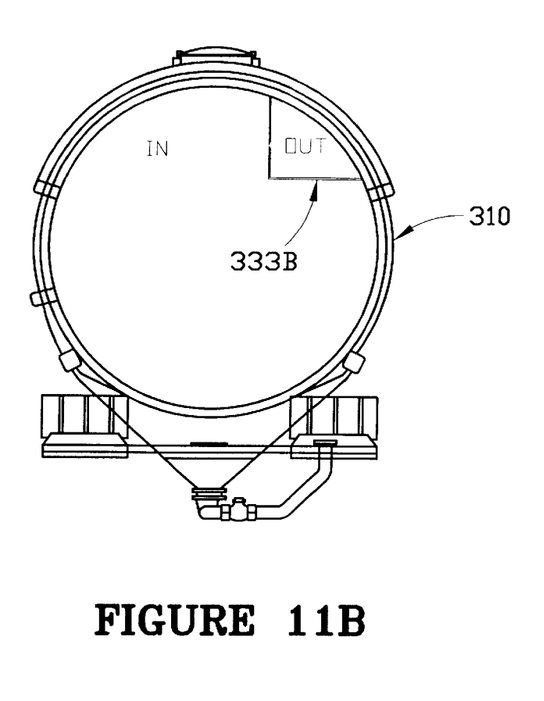
FIG. 11B illustrates a second embodiment of the ducting for pressurized gas flow of the embodiment of the invention illustrated in FIGS. 8–10.
Figure 11C:
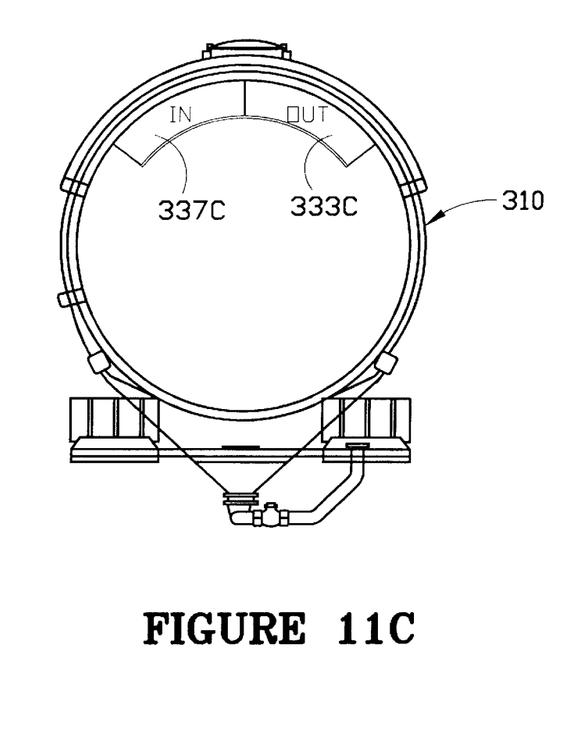
FIG. 11C illustrates a third embodiment of the ducting for pressurized gas flow of the embodiment of the invention illustrated in FIGS. 8–10.
Figure 11D:
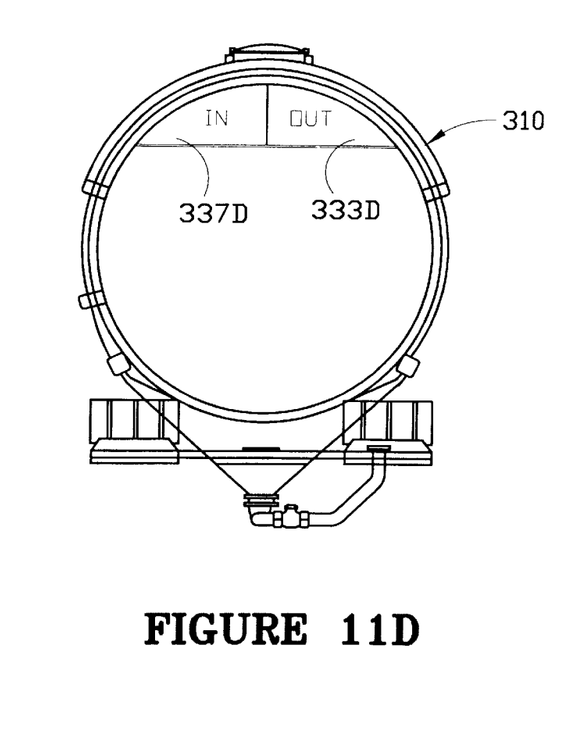
FIG. 11D illustrates a fourth embodiment of the ducting for pressurized gas flow of the embodiment of the invention illustrated in FIGS. 8–10.

FIGS. 11A–11D illustrate various ducting arrangements for conducting pressurized gas across at least a portion of thermally-conductive shell 311 of container 310. In the arrangements of FIGS. 11A and 11B, hot gas from pressurized gas inlet 332 flows down the length of the container above the particulate material therein towards the rear end of the trailer. It enters the rear end (not shown, but similar to the open rear end 335 of internal duct 333 of FIG. 8) of duct 333A or 333B and is conveyed through the internal duct to outlet 334. In the arrangements of FIGS. 11C and 11D, the gas is conducted across at least a portion of the thermally-conductive shell through first duct 337C or 337D and out the open rear end of such first ducts (not shown, but similar to the open rear end 335 of internal duct 333 of FIG. 8). Return gas is conducted into rear end (not shown) of second duct 333C or second duct 333D and is conveyed through the second duct (similar to duct 333 of FIG. 8) to outlet 334.

Figure 12:
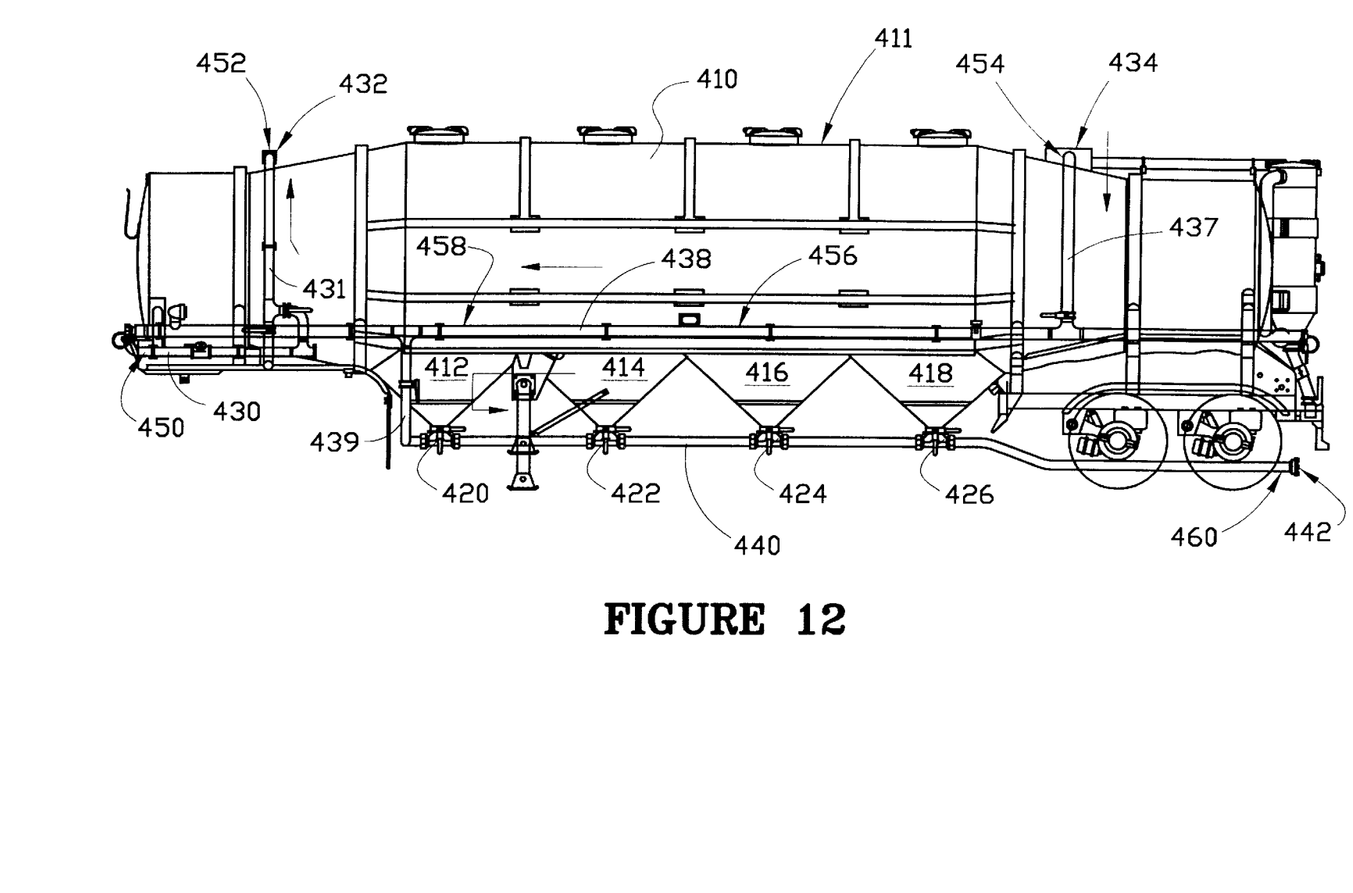
FIG. 12 is a side view of a sixth embodiment of the invention.
Figure 13:
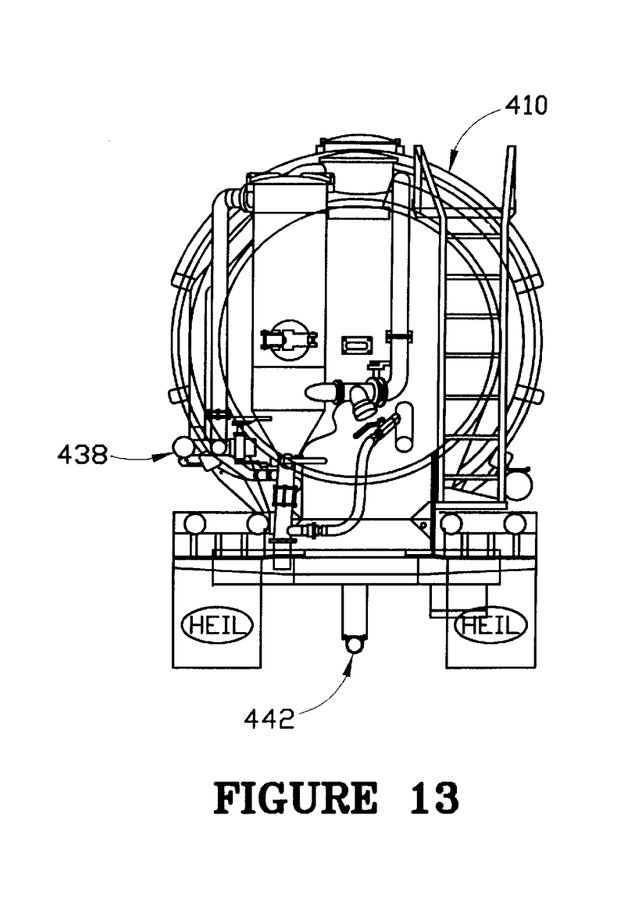
FIG. 13 is a rear view of the embodiment of FIG. 12.
Figure 14:
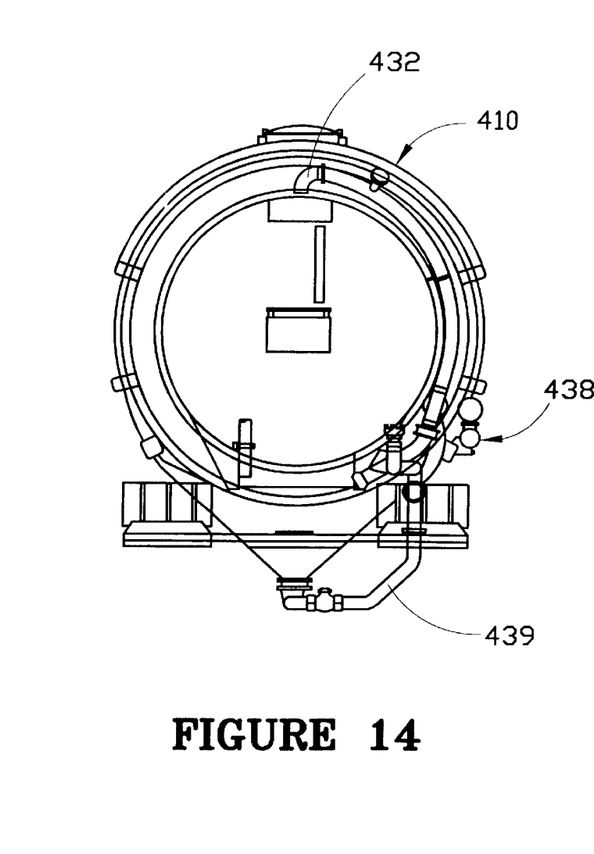
FIG. 14 is a front view of the embodiment of FIGS. 12 and 13.

FIGS. 12–14 illustrate a sixth embodiment of the invention. As shown therein, container 410, which is a modified version of a conventional self-unloading pneumatic container, is provided with thermally-conductive shell 411, and includes four generally cylindrical and horizontally disposed product compartments which are arranged along a common horizontal axis and are in at least partial fluid communication with each other. Conical discharge hoppers 412, 414, 416 and 418 are provided, one for each product compartment. Each discharge hopper has a material outlet at the bottom and a valve, such as valves 420, 422, 424 and 426, which controls the discharge of material from the outlet of the hopper. An unloading system is also provided which includes a blower or compressor (not shown) for pressurizing air or another gas or another means or source for supplying a flow of gas (also not shown). The blower or other source of pressurized gas is attached to one end of pressurized gas conduit 430, and the other end of conduit 430 is attached to conduit 431 which is attached to pressurized gas inlet 432 in the container. Pressurized gas outlet 434 is also provided in the container for removal of pressurized gas therefrom. Preferably, the pressurized gas inlet and the pressurized gas outlet will be located generally above the level of particulate material in the container. Operation of the blower will move air or gas through pressurized gas inlet 432 into the container, in the direction shown by the arrows in FIG. 12, thereby increasing the pressure of the air or gas in the container in order to assist in discharging material from the outlets into the material conveying conduit. In the embodiment of the invention illustrated in FIGS. 12–14, the flow of air or other gas is directed from pressurized gas inlet 432 at the front of container 410 across at least a portion of thermally-conductive shell 411. The pressurized gas is withdrawn from the container through outlet 434 and conveyed through conduits 437, 438 and 439 to material conveying conduit 440 at a location upstream from the hopper outlets. As shown in FIG. 12, material conveying conduit 440 extends past and connects to each of the hopper material outlets. When the system is operating and cooled pressurized gas is flowing from outlet 434 and into material conveying conduit 440, valves 420, 422, 424 and 426 may be opened to discharge particulate material into conduit 440, where such material may be entrained and transported to discharge end 442 of the conduit.

An experiment was conducted to determine the results of operation of the invention in the form illustrated in FIGS. 12–14. A conventional Heil Super FlOTM container was modified as shown in FIGS. 12–14. Thermocouple probes were placed in the conduits at locations 450, 452, 454, 456, 458 and 460. The blower used in the experiment was a PTO-driven Drum D800. The container was partially loaded with plastic pellets and the ambient temperature was 72.9° F. The barometric pressure was 1016mB, and the container pressure (under the influence of the blower) was 10 psig. The container had been sitting in direct sunlight for approximately two hours before the experiment was begun. Once the blower was started and run for about three minutes, the system temperatures were observed to be totally under the influence of the heat from the blower air. In other words, the heating effects of the sun were considered to be negligible after about three minutes of operation.

The system was operated for about 50 minutes, and the temperature measurements at the various thermocouple probes during the experiment are summarized in the table below:

| Elapsed Time (minutes) | 3 | 4 | 7 | 10 | 15 | 20 | 30 | 40 | 50 |
|---|---|---|---|---|---|---|---|---|---|
| Temp of Probe @ 450 (° F.) | 168.9 | 178.9 | 201.9 | 214.5 | 226.2 | 229.7 | 228.1 | 233.9 | 242.4 |
| Temp. of Probe @ 452 (° F.) | 148.6 | 159.6 | 183.5 | 198.2 | 210.8 | 216.3 | 216.4 | 217.3 | 223.8 |
| Temp. of Probe @ 454 (° F.) | 81.0 | 92.5 | 102.0 | 107.5 | 117.8 | 113.9 | 117.5 | 124.6 | 127.2 |
| Temp. of Probe @ 456 (° F.) | 90.8 | 95.4 | 105.4 | 111.1 | 120.5 | 116.8 | 121.2 | 127.7 | 129.1 |
| Temp. of Probe @ 458 (° F.) | 96.3 | 101.1 | 109.8 | 115.6 | 124.3 | 118.5 | 125.7 | 131.6 | 133.7 |
| Temp. of Probe @ 460 (° F.) | 81.0 | 80.6 | 80.8 | 81.5 | 82.4 | 82.3 | 83.7 | 82.2 | 82.5 |

As an examination of these experimental results reveals, the difference between the blower inlet air temperature (at probe 450) and the pressurized air outlet temperature (at probe 454) ranged from 86.4° F. (178.9° F.–92.5° F.) at four minutes of operation to 115.8° F. (229.7° F. 113.9° F.) after twenty minutes of operation. The temperature at material discharge outlet 442 (at probe 460) remained nearly constant after three minutes, varying by no more than 3.1° F. throughout the remainder of the test.

Figure 15:
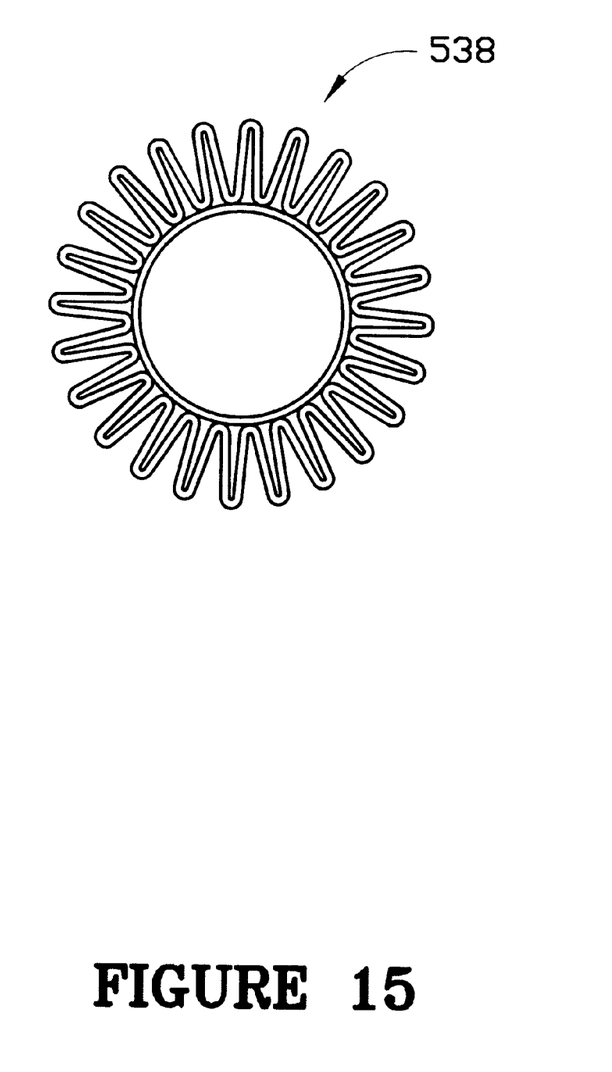
FIG. 15 is sectional view of an alternative embodiment of the pressurized gas return pipe of the embodiment of the invention illustrated in FIGS. 12–14.

This experiment shows that the temperature of the air exiting the container through outlet 434 can be reduced to less than 55° F. above ambient temperature by heat transfer from the pressurized air to the thermally conductive shell of the container. In addition, further heat transfer occurs as the pressurized gas is conducted through conduits 437, 438 and 439 to the material discharge conduit. Although conduit 438, as used in the experiment, was a standard 4-inch diameter schedule 10 pipe, it is believed that additional heat transfer could be obtained if a pipe with extended surfaces such as pipe 538, shown in cross section in FIG. 15, were employed.

A second experiment was conducted to determine the results of operation of the invention in the form illustrated in FIGS. 12–14, and to compare such operation with the operation of a radiator-type cooling system such as is described in U.S. Pat. No. 5,580,193 of Battle et al. A conventional Heil Super Flo™ container was modified as shown in FIGS. 12–14, and a radiator assembly (not shown) provided by Bulk Transportation Services, Inc. of Charenton, Louisiana (assignee of Battle et al.) was also installed on the front of the container. The blower used in the radiator-cooled portion of the experiment was a PTO-driven Drum D807, whereas the blower used in the operation of the invention was a Gardner Denver T5CDL12. The container was partially loaded with the same type of plastic pellets for both portions of the test. The ambient temperature was 75° F. during the radiator-cooled portion of the test and 74° F. during the operation of the invention. The container pressure (under the influence of the blower) was 8 psig during the radiator portion of the test and 10 psig during the operation of the invention. The radiator-cooled system and the invention were operated for about 50 minutes. The temperature measurements recorded at the discharge end of the material conveying conduit (corresponding to location 460) during the test demonstrate that the invention is at least as effective in reducing the temperature of the entraining air as is the radiator-cooled system.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations, and the same are intended to be comprehended within the meaning and range of equivalents of the appended claims.

What is claimed is:

1. A method for unloading particulate material from a container having a thermally-conductive shell, an outlet for particulate material and a material conveying conduit connected to said material outlet, which method comprises:
   (a) providing a pressurized gas inlet in the container;
   (b) providing a pressurized gas outlet in the container;
   (c) providing a cooled gas conduit between the pressurized gas outlet and the material conveying conduit;
   (d) providing a source of pressurized gas;
   (e) introducing pressurized gas into the container through the pressurized gas inlet;
   (f) directing the pressurized gas to flow across at least a portion of the thermally-conductive shell;
   (g) withdrawing the pressurized gas from the container through the pressurized gas outlet;
   (h) conducting the pressurized gas to the material conveying conduit;
   (i) discharging material through the material outlet into the material conveying conduit;
   (j) entraining the material that has been discharged through the material outlet with the pressurized gas in the material conveying conduit;
   (k) conveying the material through the material conveying conduit.

2. The method of claim 1 which includes introducing the pressurized gas into the material conveying conduit at a location upstream from the material outlet.

3. The method of claim 1 which includes:
   (a) providing a pressurized gas inlet that is located generally above the level of the material in the container;
   (b) providing a pressurized gas outlet that is located generally above the level of the material in the container.

4. The method of claim 1 which includes providing a blower to pressurize ambient air into a pressurized gas.

5. The method of claim 1 which includes providing a conduit to direct the pressurized gas to flow across at least a portion of the thermally-conductive shell.

6. The method of claim 1 which includes providing at least one baffle to direct the pressurized gas to flow across at least a portion of the thermally-conductive shell.

7. The method of claim 1 which includes expanding the volume of the pressurized gas upon or after introducing said pressurized gas into the container.

8. A system for unloading particulate material from a container having a thermally-conductive shell, an outlet for particulate material and a material conveying conduit connected to said material outlet, which system comprises:
   (a) a pressurized gas inlet in the container;
   (b) a pressurized gas outlet in the container;
   (c) a cooled gas conduit that is located between the pressurized gas outlet and the material conveying conduit;
   (d) means for providing a pressurized gas;
   (e) means for introducing pressurized gas into the container through the pressurized gas inlet;
   (f) means for directing the pressurized gas to flow across at least a portion of the thermally-conductive shell to the pressurized gas outlet;
   wherein the outlet for pressurized gas is arranged with respect to the inlet for pressurized gas so that the pressurized gas is directed to flow from said inlet across at least a portion of the thermally-conductive shell to said outlet, and wherein the conduit between the pressurized gas outlet and the material conveying conduit is arranged so that pressurized gas entering the material conveying conduit may entrain material that is discharged from the particulate material outlet and convey such material through the material conveying conduit.

9. The system of claim 8 wherein the cooled gas conduit is connected to the material conveying conduit at a location upstream from the material outlet.

10. The system of claim 8 wherein:
   (a) the pressurized gas inlet is located generally above the level of the material in the container;

(b) the pressurized gas outlet is located generally above the level of the material in the container.

11. The system of claim 8 which includes a blower that is adapted to pressurize ambient air into a pressurized gas.

12. The system of claim 8 which includes a conduit for directing the pressurized gas to flow across at least a portion of the thermally-conductive shell.

13. The system of claim 8 which includes at least one baffle for directing the pressurized gas to flow across at least a portion of the conductive shell.

14. An apparatus for storing particulate material, which apparatus comprises:

(a) a frame;

(b) a container that is supported by the frame, said container having a thermally-conductive shell;

(c) particulate material outlet through which particulate material is discharged from the container;

(d) a material conveying conduit that is connected to the particulate material outlet;

(e) an inlet for introducing pressurized gas to the container for (f) a pressurized gas outlet through which pressurized gas is withdrawn from the container;

(g) a cooled gas conduit between the pressurized gas outlet and the material conveying conduit;

(h) a blower for pressurizing gas;

(i) a conduit between the blower and the pressurized gas inlet;

wherein the pressurized gas outlet is arranged with respect to the inlet for introducing pressurized gas to the container so that the pressurized gas is directed to flow from said inlet across at least a portion of the thermally-conductive shell to said pressurized gas outlet, and wherein the cooled gas conduit between the pressurized gas outlet and the material conveying conduit is arranged so that pressurized gas entering the material conveying conduit may entrain material that is discharged from the particulate material outlet and convey such material through the material conveying conduit.

15. The apparatus of claim 14 which includes a trailer to which the frame is attached.

16. The apparatus of claim 14 which includes a downwardly depending hopper that is attached to the container in such manner that particulate material may flow from the container in to the hopper and to the outlet for particulate material.

17. The apparatus of claim 14 which includes a conduit within the thermally-conductive shell of the container between the inlet for pressurized gas and the outlet for pressurized gas.

18. The apparatus of claim 14 which includes at least one baffle between the inlet for pressurized gas and the outlet for pressurized gas.

* * * * *